US011427036B2

(12) United States Patent
Taniguchi

(10) Patent No.: US 11,427,036 B2
(45) Date of Patent: Aug. 30, 2022

(54) PNEUMATIC TIRE

(71) Applicant: Toyo Tire Corporation, Itami (JP)

(72) Inventor: Jiro Taniguchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 98 days.

(21) Appl. No.: 16/783,447

(22) Filed: Feb. 6, 2020

(65) Prior Publication Data

US 2020/0262247 A1 Aug. 20, 2020

(30) Foreign Application Priority Data

Feb. 15, 2019 (JP) .............................. JP2019-025432

(51) Int. Cl.
*B60C 11/12* (2006.01)
*B60C 11/03* (2006.01)

(52) U.S. Cl.
CPC ........ *B60C 11/1263* (2013.01); *B60C 11/032* (2013.01); *B60C 11/1204* (2013.01); *B60C 2011/1213* (2013.01)

(58) Field of Classification Search
CPC ............... B60C 11/032; B60C 11/1263; B60C 11/1259; B60C 11/1204; B60C 11/12; B60C 11/1218
See application file for complete search history.

(56) References Cited

U.S. PATENT DOCUMENTS

| 6,050,313 A | * | 4/2000 | Tsuda ..................... B60C 11/13 |
| | | | 152/DIG. 3 |
| 2010/0212794 A1 | | 8/2010 | Watabe et al. |
| 2019/0084351 A1 | * | 3/2019 | Furusawa ............... B60C 11/00 |
| 2019/0210410 A1 | * | 7/2019 | Tikka ..................... B60C 11/12 |

FOREIGN PATENT DOCUMENTS

| CN | 101784401 A | | 7/2010 | |
| JP | 2004217120 A | * | 8/2004 | ......... B60C 11/1263 |
| JP | 2007-022277 A | | 2/2007 | |
| JP | 2008-062749 A | | 3/2008 | |
| JP | 2008062749 A | * | 3/2008 | ......... B60C 11/1263 |
| JP | 2009-274726 A | | 11/2009 | |
| JP | 2011148472 A | * | 8/2011 | |
| JP | 2013-039871 A | | 2/2013 | |
| JP | 2017-197111 A | | 11/2017 | |

OTHER PUBLICATIONS

JP 2004217120 Machine Translation; Maruoka, Kiyoto (Year: 2004).*
(Continued)

*Primary Examiner* — Robert C Dye
*Assistant Examiner* — Nicholas J Weiler
(74) *Attorney, Agent, or Firm* — WHDA, LLP

(57) ABSTRACT

A pneumatic tire according to the embodiment includes a land portion 20 provided on a tread portion, a plurality of sipes 30 provided on the land portion 20, and at least one concave portion 34 disposed between two adjacent sipes 30. Each of the sipes 30 has, at parts in a sipe longitudinal direction, bottom protrusions 42, 44, 46 protruding from a bottom surface of the sipe 30 toward a tread surface. The concave portion 34 is provided close to the bottom protrusions 42, 44, 46.

10 Claims, 7 Drawing Sheets

(56) References Cited

OTHER PUBLICATIONS

JP 2008062749 Machine Translation; Saeki, Kentaro (Year: 2008).*
JP 201148472 Machine Translation; Hashimoto, Yoshimasa (Year: 2011).*
Office Action dated Nov. 3, 2021, issued in counterpart CN application No. 201911376335.2, with English translation. (13 pages).
Office Action dated Feb. 16, 2022, issued in counterpart DE application No. 10 2020 103 859.3, with English Translation. (14 pages).

* cited by examiner

PNEUMATIC TIRE

TECHNICAL FIELD

The present invention relates to a pneumatic tire.

BACKGROUND ART

As described in JP-A-2009-274726, a pneumatic tire having sipes formed in a tread portion is known. In such a pneumatic tire, an edge effect is exerted by the sipes, so that driving performance on a frozen road surface is excellent.

Sipes reduce the rigidity of land portions, and excessive collapse of the land portions is likely to occur. Therefore, in some cases, protrusions protruding from bottom surfaces of sipes toward a tread surface are provided at parts in a sipe longitudinal direction to prevent the excessive collapse of the land portions.

However, when the protrusions as described above are provided at parts in the sipe longitudinal direction, rigidity locally increases near the protrusions, and steering stability is impaired.

SUMMARY OF THE INVENTION

In view of the above points, an object of the present invention is to provide a pneumatic tire in which the rigidity of the land portions is made uniform and the driving stability is improved while suppressing the excessive collapse of the land portions.

A pneumatic tire of the present invention includes land portions provided on a tread portion, a plurality of sipes provided on the land portions, and at least one concave portion disposed between two adjacent sipes. Each of the sipes has, at parts in a sipe longitudinal direction, bottom protrusions protruding from a bottom surface of the sipe toward a tread surface. The concave portion is provided close to the bottom protrusions.

In the present invention, the concave portion disposed between the sipes is provided close to the bottom protrusions. Therefore, the rigidity of the land portions can be made uniform and the driving stability can be improved while suppressing the excessive collapse of the land portions.

DETAILED DESCRIPTION OF THE INVENTION

Figure 1:
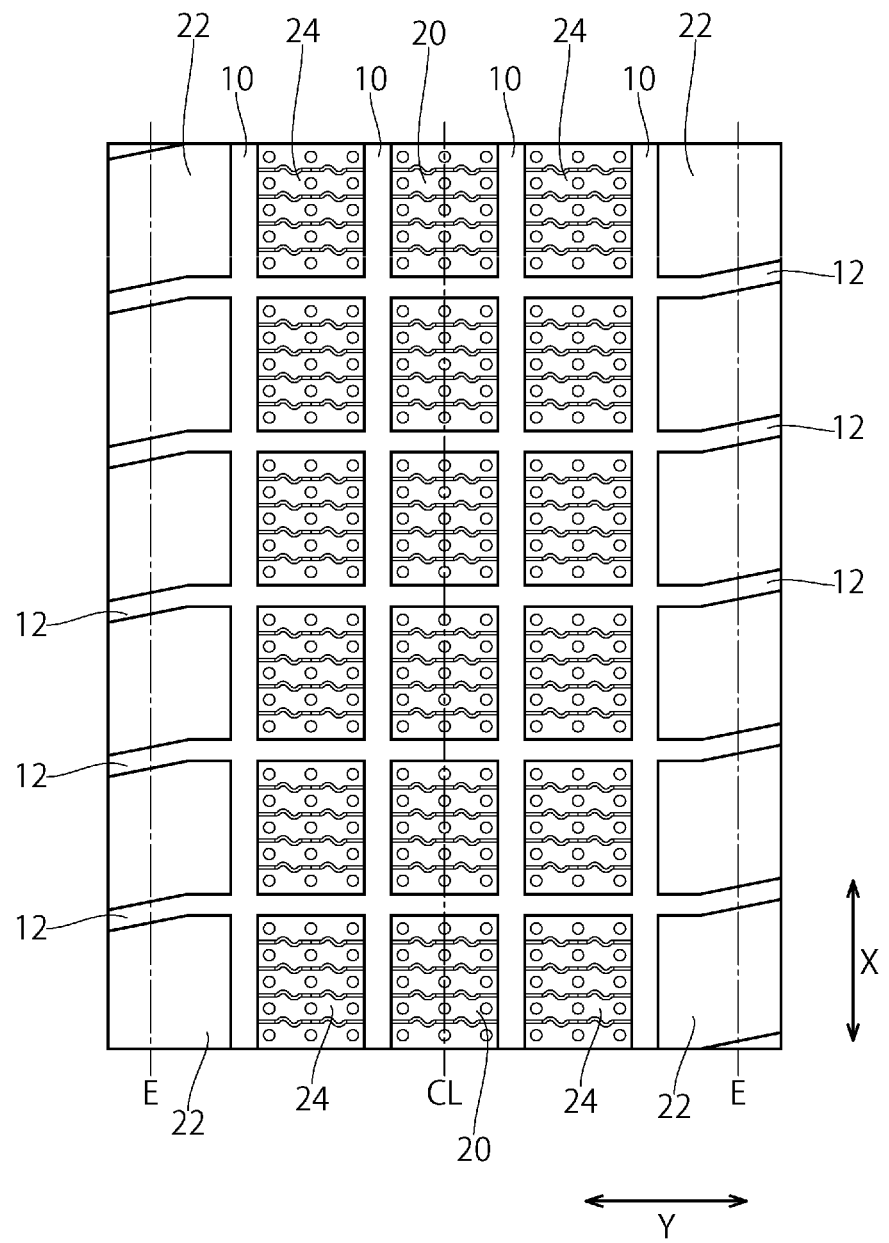
FIG. 1 is a view showing a tread pattern of a pneumatic tire according to an embodiment of the present invention.

An embodiment of the present invention will be described with reference to the drawings. Meanwhile, the present embodiment is merely an example, and those appropriately changed without departing from the spirit of the present invention are included in the scope of the present invention. Further, for the convenience of explanation, the drawings may be exaggerated or schematically drawn in length, shape, and the like. However, such drawings are merely examples and do not limit the interpretation of the present invention.

Meanwhile, unless otherwise specified, the features of the pneumatic tire in the following description are features in a no-load state of the pneumatic tire which is mounted on a normal rim and filled with a normal internal pressure. Here, the normal rim means the "Standard Rim" in JATMA standard, the "Design Rim" in TRA standard, or the "Measuring Rim" in ETRTO standard. Further, the normal internal pressure means the "Highest Air Pressure" in JATMA standard, the Maximum Value set in "TIRE LOAD LIMITS AT VARIOUS COLD INFLATION PRESSURES" in TRA standard, or the "INFLATION PRESSURE" in ETRTO standard. Here, the normal internal pressure is 180 kPa when the pneumatic tire is used for a passenger car. However, the normal internal pressure is 220 kPa when "Extra Load" or "Reinforced" is described in the tire.

By the way, the normal load described below means the "MAXIMUM LOAD CAPACITY" in JATMA standard, the Maximum Value set in "TIRE LOAD LIMITS AT VARIOUS COLD INFLATION PRESSURES" in TRA standard, or the "LOAD CAPACITY" in ETRTO standard. Here, the normal load is 85% of the load corresponding to the internal pressure of 180 kPa when the pneumatic tire is used for a passenger car.

The pneumatic tire according to the present embodiment has the same structure as a general radial tire except for the structure of a tread portion. For example, the general structure of the pneumatic tire according to the present embodiment is as follows.

First, bead portions are provided on both sides in the tire width direction. Each of the bead portions has a bead core made of a steel wire wound in a circular shape and a rubber bead filler provided radially outside the bead core. A carcass ply is bridged between the bead portions on both sides in the tire width direction. The carcass ply is a sheet-like member in which a large number of ply cords arranged in a direction perpendicular to the tire peripheral direction are covered with rubber. The carcass ply forms a skeleton shape of the pneumatic tire between the bead portions on both sides in the tire width direction, and wraps the bead portions by being folded back around the bead portions from the inside to the outside in the tire width direction. A sheet-like inner liner made of rubber with low air permeability is attached to the inside of the carcass ply.

One or more belts are provided on the outer side of the carcass ply in the tire radial direction. A belt reinforcing layer is provided on the outer side of the belt in the tire radial direction. The belt is a member in which a large number of steel cords are covered with rubber. The belt reinforcing layer is a member in which a large number of cords made of organic fibers are covered with rubber. A tread portion having a ground contact surface is provided on the outer side of the belt reinforcing layer in the tire radial direction. Further, sidewalls are provided on both sides of the carcass ply in the tire width direction. In addition to these members, members such as a belt lower pad and a chafer are provided, as necessary for the function of the tire.

Subsequently, the tread portion will be described. A tread pattern having a plurality of land portions and a plurality of grooves is formed in the tread portion. One land portion forms one continuous ground contact surface when the normal load is applied to the pneumatic tire attached to the normal rim and filled with the normal internal pressure.

Although not particularly limited, the tread pattern having the land portions is, for example, a tread pattern as shown in FIG. 1. The tread pattern shown in FIG. 1 is provided with four main grooves 10 extending in the tire peripheral direction (direction indicated by the arrow X in FIG. 1) and a large number of lateral grooves 12 extending in the tire width direction (direction indicated by the arrow Y in FIG. 1). Further, a large number of land portions divided by the main grooves 10 and the lateral grooves 12 are formed.

In the embodiment shown in FIG. 1, as the land portions, a plurality of center blocks 20 sandwiched between two main grooves 10 close to a tire center line CL, a pair of left and right shoulder blocks 22 sandwiched between the main grooves 10 close to tire ground contact ends E on both sides in the tire width direction Y and the tire ground contact ends E, and a plurality of mediate blocks 24 between the center block 20 and the shoulder blocks 22 are formed. All of the blocks are arranged in the tire peripheral direction X to form a row of blocks.

Meanwhile, the main groove may not extend linearly in the tire peripheral direction X, unlike the main grooves 10 in FIG. 1. For example, the main groove may have a zigzag shape extending in the tire peripheral direction X while bending, a corrugated shape extending in the tire peripheral direction X while bending, or a shape extending obliquely with respect to the tire peripheral direction X. Further, the land portions may be ribs extending in the tire peripheral direction X, which are divided by the main grooves extending in the tire peripheral direction X but are not divided by the lateral grooves.

Figure 2:
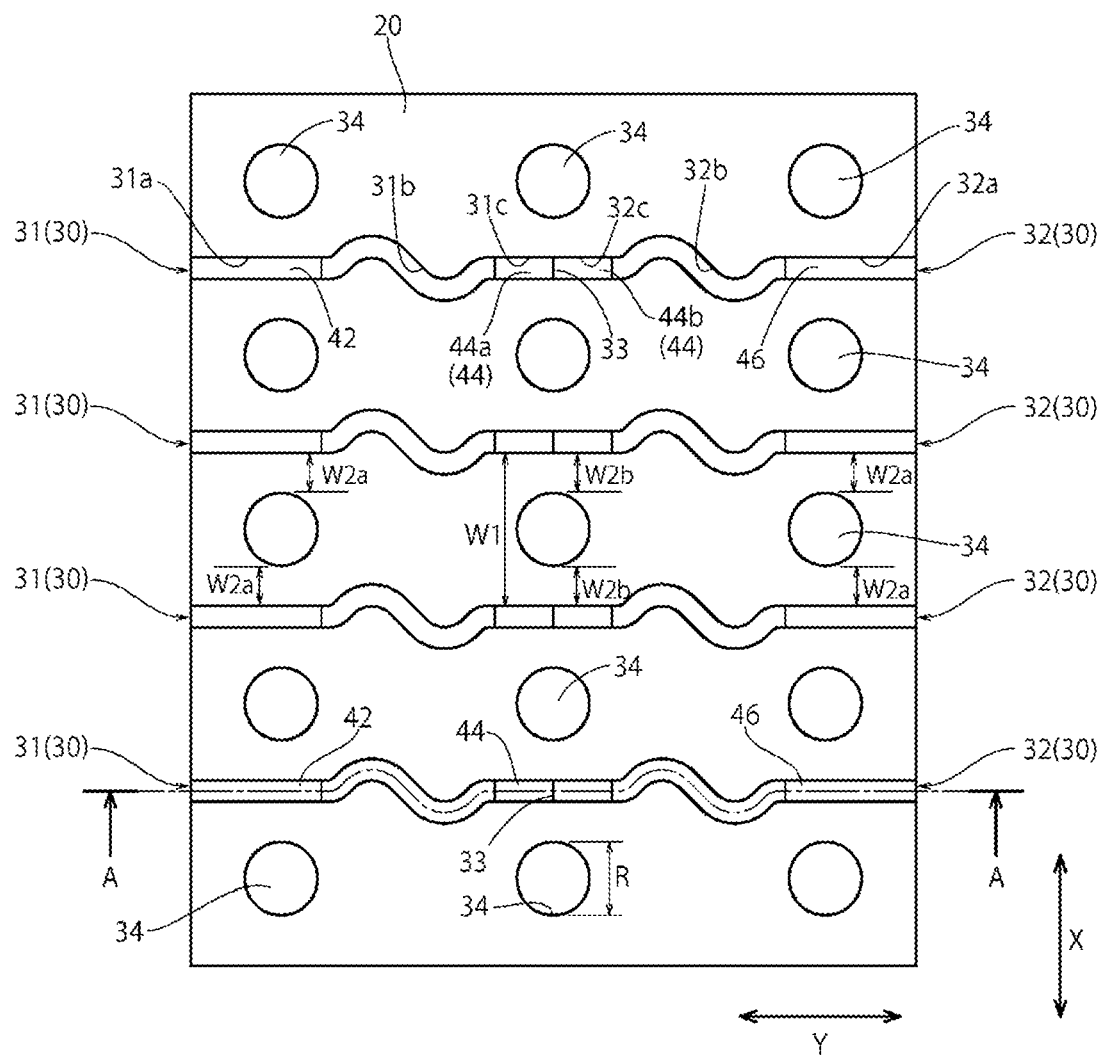
FIG. 2 is a view of a center block 20 viewed from a direction perpendicular to a tread surface.

Subsequently, the structure of the land portion will be described by taking the center block 20 as an example. As shown in FIG. 2, in the center block 20, a plurality of sipes 30 extending in the tire width direction Y are provided at intervals in the tire peripheral direction X. The sipe 30 refers to a narrow groove. More precisely, the sipe 30 refers to a groove whose opening to the ground surface is closed when the pneumatic tire attached to the normal rim and filled with the normal internal pressure contacts a ground and the normal load is applied to the pneumatic tire.

Figure 3:
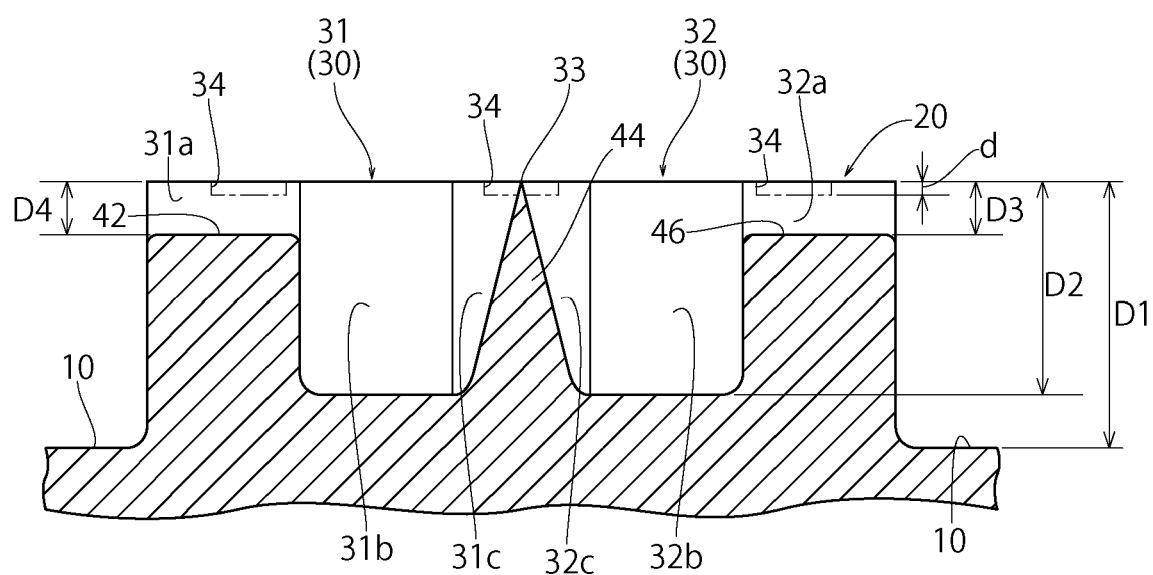
FIG. 3 is a sectional view taken along the line A-A in FIG. 2.

As shown in FIGS. 2 and 3, each of the sipes 30 has a first sipe 31, a second sipe 32, and a joint portion 33 where end portions of the first sipe 31 and the second sipe 32 are butted in the sipe longitudinal direction. Each of the sipes 30 is configured such that the first sipe 31 and the second sipe 32 are connected at the joint portion 33 to form one sipe 30.

The first sipe 31 has an outer straight portion 31a, a corrugated portion 31b, and an inner straight portion 31c in order from the main groove 10 defining one side of the center block 20 in the tire width direction Y toward the center in the width direction of the center block 20.

The outer straight portion 31a is a narrow groove extending linearly in the tire width direction Y from the main groove 10 as viewed from a direction perpendicular to the tread surface. The outer straight portion 31a has one end opening to the main groove 10 and the other end connected to the corrugated portion 31b. An outer bottom protrusion 42 protruding from a bottom surface of the first sipe 31 toward the tread surface is provided on at least a part of the outer straight portion 31a. The outer bottom protrusion 42 is provided to connect a pair of wall surfaces defining the outer straight portion 31a over a predetermined length (e.g., 2 to 3 mm) from an opening end of the outer straight portion 31a. The protrusion height of the outer bottom protrusion 42 from the bottom surface of the first sipe 31 is constant in the sipe longitudinal direction.

The corrugated portion 31b is a corrugated narrow groove extending in the tire width direction Y while meandering from the outer straight portion 31a, as viewed from the direction perpendicular to the tread surface. The corrugated portion 31b has one end connected to the outer straight portion 31a and the other end connected to the inner straight portion 31c.

The inner straight portion 31c is a narrow groove extending linearly in the tire width direction Y from the corrugated portion 31b, as viewed from the direction perpendicular to the tread surface. The inner straight portion 31c has one end connected to the corrugated portion 31b and the other end connected to an inner straight portion 32c of the second sipe 32. An inner bottom protrusion 44 protruding from the bottom surface of the first sipe 31 toward the tread surface is provided on at least a part of the inner straight portion 31c.

The protrusion height of the inner bottom protrusion 44 from the bottom surface of the first sipe 31 increases from the inner straight portion 31c on the side of the corrugated portion 31b toward the second sipe 32 and is highest at the joint portion 33.

The second sipe 32 has an outer straight portion 32a, a corrugated portion 32b, and the inner straight portion 32c in order from the main groove 10 defining the other side of the center block 20 in the tire width direction Y toward the center in the width direction of the center block 20.

The outer straight portion 32a is a narrow groove extending linearly in the tire width direction Y from the main groove 10 as viewed from the direction perpendicular to the tread surface. The outer straight portion 32a has one end opening to the main groove 10 and the other end connected to the corrugated portion 32b. An outer bottom protrusion 46 protruding from the bottom surface of the second sipe 32 toward the tread surface is provided on at least a part of the outer straight portion 32a. The outer bottom protrusion 46 is provided to connect a pair of wall surfaces defining the outer straight portion 32a over a predetermined length (e.g., 2 to 3 mm) from an opening end of the outer straight portion 32a. The protrusion height of the outer bottom protrusion 46 from the bottom surface of the second sipe 32 is constant in the sipe longitudinal direction.

The corrugated portion 32b is a corrugated narrow groove extending in the tire width direction Y while meandering from the outer straight portion 32a, as viewed from the direction perpendicular to the tread surface. The corrugated portion 32b has one end connected to the outer straight portion 32a and the other end connected to the inner straight portion 32c.

The inner straight portion 32c is a narrow groove extending linearly in the tire width direction Y from the corrugated portion 32b, as viewed from the direction perpendicular to the tread surface. The inner straight portion 32c has one end connected to the corrugated portion 32b and the other end connected to the inner straight portion 31c of the first sipe 31. The inner bottom protrusion 44 protruding from the bottom surface of the second sipe 32 toward the tread surface is provided on at least a part of the inner straight portion 32c.

The protrusion height of the inner bottom protrusion 44 provided on the second sipe 32 from the bottom surface of the sipe 30 increases from the inner straight portion 32c on the side of the corrugated portion 32b toward the first sipe 31 and is highest at the joint portion 33. The inner bottom protrusion 44 provided on the second sipe 32 is connected to the inner bottom protrusion 44 provided on the first sipe 31 at the joint portion 33. In other words, the inner bottom protrusion 44 is provided to straddle the inner straight portion 31c of the first sipe 31 and the inner straight portion 32c of the second sipe 32. The inner bottom protrusion 44 has a tapered shape which becomes shorter in the sipe longitudinal direction from the bottom surfaces of the first sipe 31 and the second sipe 32 toward the tread surface. A leading end of the inner bottom protrusion 44 is located at the joint portion 33. In the case shown in FIG. 3, the leading end of the inner bottom protrusion 44 protrudes in the tire radial direction to the same position as the tread surface. Here, the protrusion height of the leading end of the inner bottom protrusion 44 is not limited to this, and the leading end of the inner bottom protrusion 44 may be located on the bottom side of the sipe 30 from the tread surface.

The respective depths of the first sipe 31, the second sipe 32 and the joint portion 33 constituting the sipe 30, that is, a depth D2 at a position (i.e., of the corrugated portions 31b, 32b) where the outer bottom protrusions 42, 46 and the inner bottom protrusion 44 are not provided, and depths D3, D4 at positions (i.e., of the outer straight portions 31a, 32a) where the outer bottom protrusions 42, 46 are provided are not limited. However, each of the depths D2, D3, D4 is generally shallower than a depth of the main groove 10.

As shown in FIGS. 2 and 3, concave portions 34 are provided between two adjacent sipes 30 in the center block 20. The concave portions 34 are provided not to be in contact with the sipe 30 and close to the outer bottom protrusions 42, 46 and the inner bottom protrusion 44 of the sipe 30. Each of the concave portions 34 has a circular opening end to the tread surface.

In the present embodiment, the concave portions 34 are disposed to be located between the inner bottom protrusions 44 provided on two adjacent sipes and between the outer bottom protrusions 42, 46.

In the present embodiment, a shortest distance W2a along the tread surface from the concave portions 34 to the outer bottom protrusions 42, 46 of the sipe 30 and a shortest distance W2b along the tread surface from the concave portions 34 to the inner bottom protrusion 44 of the sipe 30 are preferably not less than 1 mm and not more than 5 mm, more preferably, not less than 1 mm and not more than 3 mm.

Further, the distances W2a, W2b are preferably not less than 0.5 times and not more than 2 times diameters R at opening ends of the concave portions 34. A ratio W2a/W1 and a ratio W2b/W1 of the distances W2a, W2b to a distance W1 between the sipes on both sides of the concave portions 34 are preferably not less than 0.1 and not more than 0.3.

Among the concave portions 34 disposed between two adjacent sipes 30, the concave portion 34 close to the inner bottom protrusion 44 is preferably disposed such that the shortest distance W2b along the tread surface up to the inner bottom protrusion 44 provided on one of the sipes 30 is equal to the shortest distance W2b along the tread surface up to the inner bottom protrusion 44 provided on the other of the sipes 30.

Among the concave portions 34 disposed between two adjacent sipes 30, the concave portions 34 close to the outer bottom protrusions 42, 46 are preferably disposed such that the distances W2a, W2a along the tread surface up to the outer bottom protrusions 42, 46 provided on one of the sipes 30 are equal to the distances W2a, W2a along the tread surface up to the outer bottom protrusions 42, 46 provided on the other of the sipes 30.

The concave portions 34 provided close to the outer bottom protrusions 42, 46 may be arranged at positions away from the outer bottom protrusions 42, 46 in any direction. However, preferably, the concave portions 34 are arranged to overlap the outer bottom protrusions 42, 46 of the sipe 30 in the tire width direction Y, as shown in FIG. 2 and the like. That is, it is preferable to arrange the concave portions 34 such that projection planes of the concave portions 34 projected in the tire peripheral direction X overlap the outer bottom protrusions 42, 46. More preferably, the concave portions 34 are arranged such that the centers thereof overlap the outer bottom protrusions 42, 46 of the sipe 30 in the tire width direction Y.

The concave portion 34 provided close to the inner bottom protrusion 44 may be arranged at a position away from the inner bottom protrusion 44 in any direction. However, preferably, the concave portion 34 is arranged to overlap the position (i.e., the joint portion 33) where the protrusion height of the inner bottom protrusion 44 of the sipe 30 in the tire width direction Y is highest, as shown in FIG. 2 and the like. More preferably, the concave portion 34 is arranged such that its center overlaps the joint portion 33 in the tire width direction Y.

A depth d of the concave portion 34 is preferably shallower than a depth D1 of the main groove 10. The depth d of the concave portion 34 is, more preferably, not less than ¼ times the depth D1 of the main groove 10, even more preferably, not less than ¼ times and not more than 1 times the depth D1 of the main groove 10, even more preferably, not less than ½ times and not more than 1 times the depth D1 of the main groove 10. Further, the depth d of the concave portion 34 is preferably deeper than depths D3, D4 at positions where the outer bottom protrusions 42, 46 are provided, and the depth of the sipe at the joint portion 33. As an example, when the depth D1 of the main groove 10 is 8 mm, the depth d of the concave portion 34 can be not less than 0.05 mm and not more than 6 mm.

Although not particularly limited, the diameter R at the opening end of the concave portion 34 can be, for example, not less than 1.5 mm and not more than 3.5 mm.

The diameter R at the opening end of the concave portion 34 provided close to the tapered bottom protrusion such as the inner bottom protrusion 44 is preferably not less than ½ times and not more than 2 times the length of the bottom protrusion along the sipe longitudinal direction at the half position of the depth D1 of the main groove 10.

Further, the inner diameter of the concave portion 34 provided close to the tapered bottom protrusion such as the inner bottom protrusion 44 may gradually increase toward the bottom side (from the opening end toward the bottom).

Meanwhile, although the sipes 30 shown in FIGS. 2 and 3 extend in the tire width direction Y, the direction in which the sipes extend is not limited to this direction, and may be the tire peripheral direction X or a direction oblique to the tire peripheral direction X and the tire width direction Y.

Further, although the sipes 30 shown in FIGS. 2 and 3 are deeper in a direction perpendicular to the tread surface, the sipes 30 may be deeper in a direction slightly oblique to the direction perpendicular to the tread surface.

Further, the shape of the opening end of the concave portion 34 is not limited to the circular shape shown in FIG. 2 and may be a polygon such as a square, a pentagon, or a hexagon, for example.

Figure 4A:
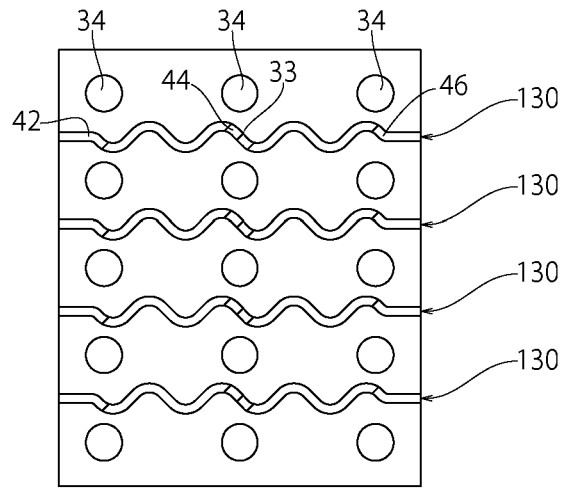
FIG. 4A is a view showing a modified example of the shapes of sipes.
Figure 4B:
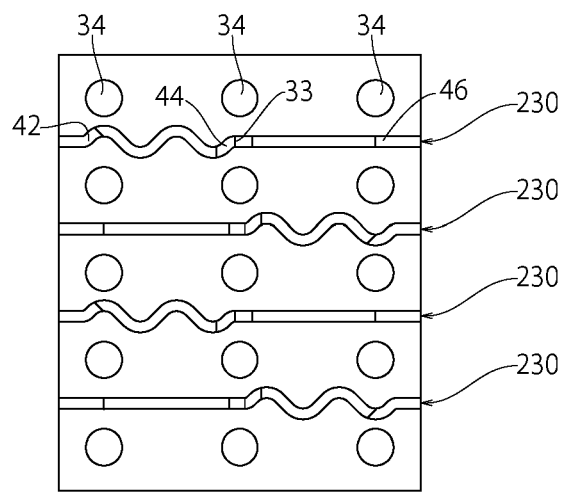
FIG. 4B is a view showing a modified example of the shapes of sipes.
Figure 4C:
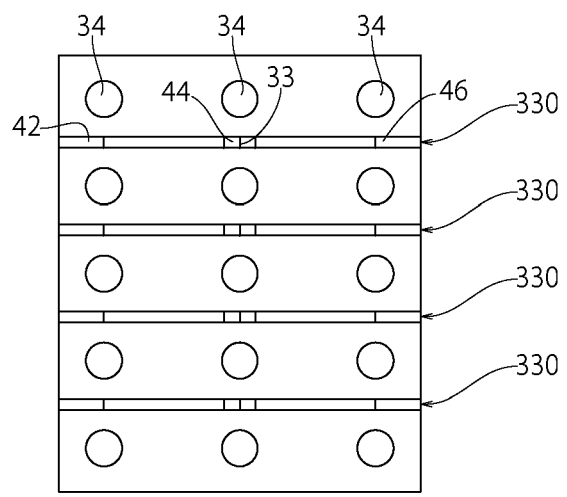
FIG. 4C is a view showing a modified example of the shapes of sipes.

Although the sipes 30 in FIG. 2 are sipes in which the straight portions 31a, 31c, 32a, 32c and the corrugated portions 31b, 32b are alternately connected, the shapes of the sipes 30 are not limited thereto. Instead of the sipes 30 shown in FIG. 2, for example, sipes 130 in which substantially the entire of the center block 20 in the tire width direction is composed of corrugated portions as shown in FIG. 4A, sipes 230 in which straight portions and corrugated portions are connected as shown in FIG. 4B, and sipes 330 in which the entire of the center block 20 in the tire width direction is composed of straight portions as shown in FIG. 4C may be provided.

Further, in the present embodiment, as shown in FIGS. 2 and 3, the outer bottom protrusions 42, 46 and the inner bottom protrusion 44 are respectively provided at both ends and the center in the longitudinal direction of the sipe 30, and the concave portions 34 are provided at positions close to the outer bottom protrusions 42, 46 and the inner bottom protrusion 44. However, the positions where the bottom protrusions and the concave portion 34 are provided are not limited thereto. For example, as shown in FIGS. 5A to 5D, the bottom protrusions may not be provided at both ends in the longitudinal direction of the sipes 30, 130, 230, 330, the inner bottom protrusions 44 may be provided at the centers (joint portions) in the longitudinal direction of the sipes 30, 130, 230, 330, and the concave portions 34 may be provided near the inner bottom protrusions 44. Alternatively, for example, as shown in FIGS. 6A to 6D, the joint portion and the bottom protrusions may not be provided at the centers in the longitudinal direction of the sipes 30, 130, 230, 330, the outer bottom protrusions 42, 46 may be provided at both ends in the longitudinal direction of the sipes 30, 130, 230, 330, and the concave portions 34 may be provided near the outer bottom protrusions 42, 46.

Further, in the present embodiment, the concave portions 34 are provided near all of the bottom protrusions 42, 44, 46 provided on the sipes 30. However, the concave portion may not be provided near some of the bottom protrusions, and the concave portion may be provided near the remaining of the bottom protrusions.

Further, in the present embodiment, the concave portions 34 are provided only near the bottom protrusions 42, 44, 46 provided on the sipes 30. However, the concave portions 34 may be provided near at least some of the bottom protrusions 42, 44, 46, and the concave portions 34 may be additionally provided at positions away from the bottom protrusions 42, 44, 46.

So far, the center block 20 has been described as an example. However, the land portion having the above features regarding the sipe and the concave portion is not limited to the center block 20. As shown in FIG. 1, each of the center blocks 20 and the mediate blocks 24 may have the sipes and the concave portions as described above, or all blocks may have the sipes and the concave portions as described above. That is, it is only necessary that at least one of the center blocks 20, the shoulder blocks 22 and the mediate blocks 24 has the above features regarding the sipe and the concave portion.

The pneumatic tire according to the present embodiment can be manufactured by the same method as that for a general radial tire. However, it is necessary that a convex portion for forming the concave portion 34 at the time of vulcanization molding is provided on an inner surface of a mold for vulcanization molding. This convex portion may be formed by protruding, into the mold, a portion on the inside of the mold of a spring vent for discharging air inside the mold to the outside.

Subsequently, effects of the present embodiment will be described. In the pneumatic tire according to the present embodiment, edge effects are exerted by each of the sipes 30 and the concave portions 34, so that driving performance on a frozen road surface is excellent.

Furthermore, in the pneumatic tire according to the present embodiment, since the concave portions 34 are provided close to the outer bottom protrusions 42, 46 and the inner bottom protrusion 44 provided on the sipe 30, rigidity can be made uniform within the block. Therefore, the ground contact pressure distribution of the blocks such as the center blocks 20 on a road surface with a low friction coefficient such as a frozen road surface is made uniform, so that the driving performance on a frozen road surface can be improved.

Further, in the pneumatic tire according to the present embodiment, when the depth d of the concave portion 34 is deeper than the depths D3, D4 at positions where the outer bottom protrusions 42, 46 are provided and the depth of the sipe at the joint portion 33, an edge effect is exerted by the concave portions 34 provided near the bottom protrusions even when the bottom protrusions 42, 44, 46 are exposed to the tread surface due to the wear of the center blocks 20. Therefore, the driving performance on a frozen road surface is excellent even when the center blocks 20 are worn.

Further, in the pneumatic tire according to the present embodiment, when the depth d of the concave portion 34 is not less than ¼ times the depth D1 of the main groove 10, the concave portion 34 is hardly worn out, and the driving performance on a frozen road surface can be improved for a long time. When the depth d of the concave portion 34 is not less than ½ times the depth D1 of the main groove 10, the driving performance on a frozen road surface can be further improved for a long time.

Further, near the tapered bottom protrusion such as the inner bottom protrusion 44, the rigidity increases as the block wears. However, in the pneumatic tire according to the present embodiment, the concave portion whose inner diameter gradually increases toward the bottom is provided as the concave portion provided close to the tapered bottom protrusion. Therefore, the rigidity of the block is liable to be reduced by the concave portion as the block wears. As a result, the rigidity of the block is made uniform for a long time, and the driving performance on a frozen road surface can be improved.

Further, in the pneumatic tire according to the present embodiment, when the ratio W2a/W1 and the ratio W2b/W1 are not less than 0.1 and not more than 0.3, the edge effect by the sipes 30 and the concave portions 34 are improved and the driving performance on a frozen road surface is further improved. Specifically, when each of the ratios W2a/W1 and W2b/W1 is not less than 0.1, the rubber portion between the sipes and the concave portions 34 has a sufficient thickness and can exhibit a large elastic force. Therefore, the edge effect is improved and the driving performance on a frozen road surface is further improved. Further, when each of the ratios W2a/W1 and W2b/W1 is not more than 0.3, the rubber portion between the sipes 30 and the concave portions 34 can be deformed without being too thick. As a result, the rubber portion between the sipes 30 and the concave portions 34 can exhibit a large elastic force and the rigidity near the bottom protrusions 42, 44, 46 can be appropriately reduced by the concave portions 34, so that the rigidity of the block can be made uniform. In this way, the edge effect can be improved and the ground contact pressure distribution of the block can be made uniform, so that the driving performance on a frozen road surface is further improved.

Further, in the pneumatic tire according to the present embodiment, the concave portions 34 are provided to overlap the outer bottom protrusions 42, 44, 46 of the sipes 30 in the tire width direction Y. In this way, the concave portions 34 can exhibit an edge effect at a position where it is difficult to obtain an edge effect during acceleration and braking due to the presence of the outer bottom protrusions 42, 44, 46, and the driving performance on a frozen road surface is further improved.

Figure 7:
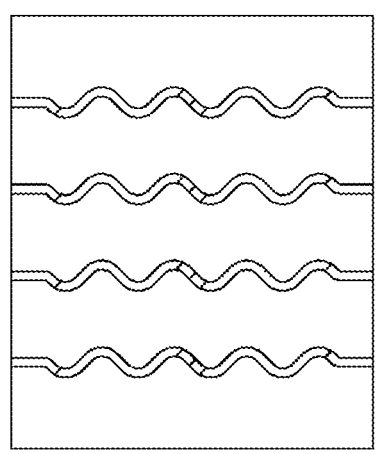
FIG. 7 is a view of a center block of a pneumatic tire according to a comparative example viewed from a direction perpendicular to a tread surface.

In order to confirm the effects of the above embodiments, the steering stability on an ice-covered road surface of the pneumatic tires of Examples and Comparative Example shown in FIGS. 2, 4A and 4B, 5A to 5C, 7 and Table 1 was evaluated. The pneumatic tires of Examples 1 to 6 have the same features as those of the pneumatic tire according to the above embodiment, and the concave portions 34 are provided on all the blocks including the center blocks 20. The pneumatic tires of Examples 1 to 6 are different from each other in the shape of the sipes as viewed from the direction perpendicular to the tread surface and the positions where the concave portions are provided. The pneumatic tire of Comparative Example 1 shown in FIG. 7 is different from the pneumatic tire according to the above embodiment in that the concave portions 34 are not provided on all the blocks.

The steering stability on an ice-covered road surface was evaluated as follows. First, a driver got into a vehicle equipped with each type of pneumatic tires and performed acceleration, braking, turning and lane changing on an ice-covered road surface. Then, the driver performed a sensory evaluation on steering stability. The evaluation was performed with the result of Comparative Example 1 set to 100 and with an index indicating that the larger the index, the better the steering stability on an ice-covered road surface.

The evaluation results are represented in Table 1. It was confirmed that the pneumatic tires of Examples 1 to 6 having the same features as those of the above embodiment were superior to the pneumatic tire of Comparative Example 1 in steering stability on an ice-covered road surface.

TABLE 1

Figure 5A:
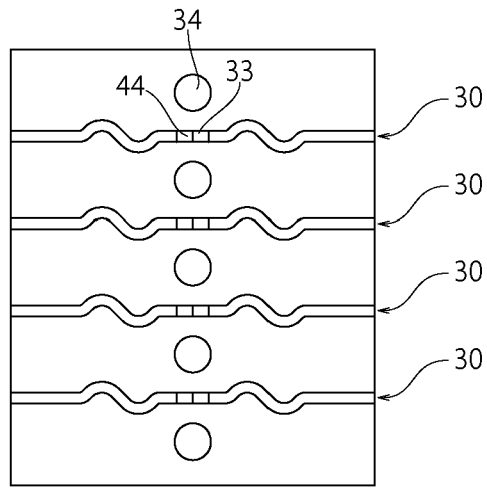
FIG. 5A is a view showing a modified example of the shapes of sipes and the arrangement of concave portions.
Figure 5B:
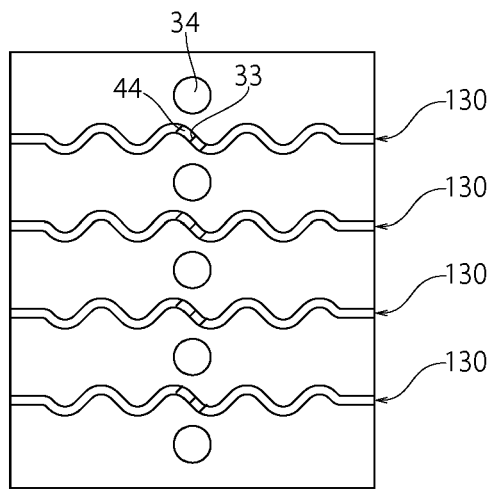
FIG. 5B is a view showing a modified example of the shapes of sipes and the arrangement of concave portions.
Figure 5C:
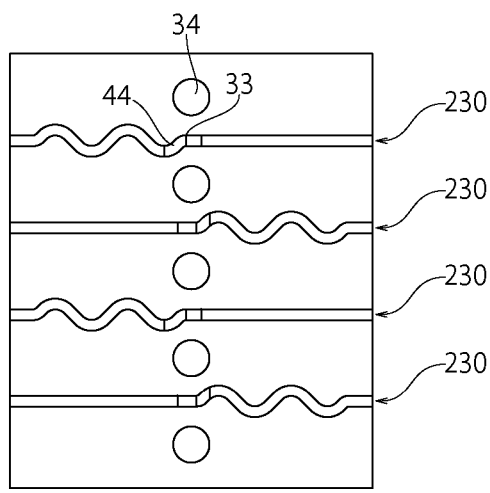
FIG. 5C is a view showing a modified example of the shapes of sipes and the arrangement of concave portions.
Figure 5D:
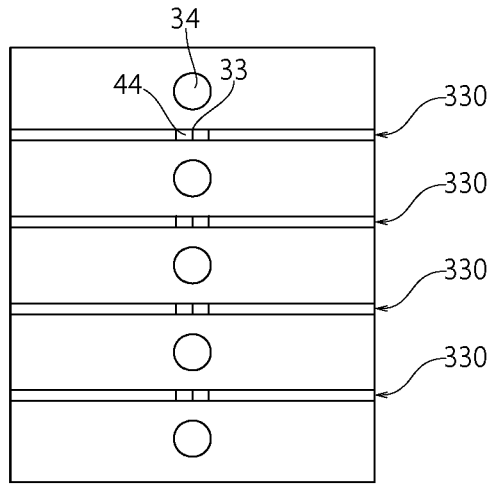
FIG. 5D is a view showing a modified example of the shapes of sipes and the arrangement of concave portions.
Figure 6A:
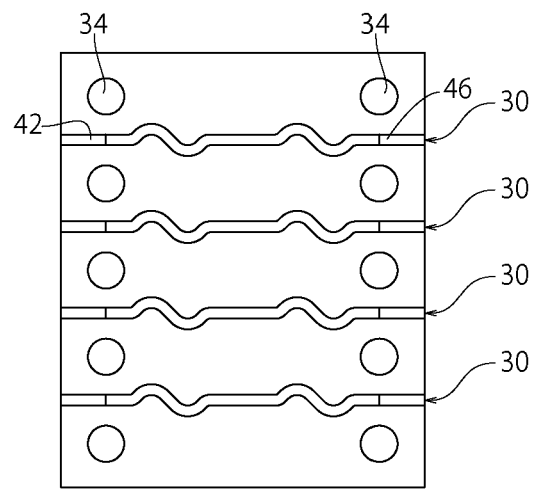
FIG. 6A is a view showing a modified example of the shapes of sipes and the arrangement of concave portions.
Figure 6B:
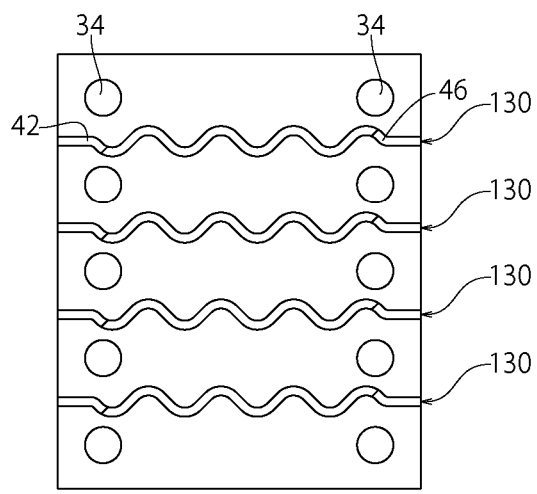
FIG. 6B is a view showing a modified example of the shapes of sipes and the arrangement of concave portions.
Figure 6C:
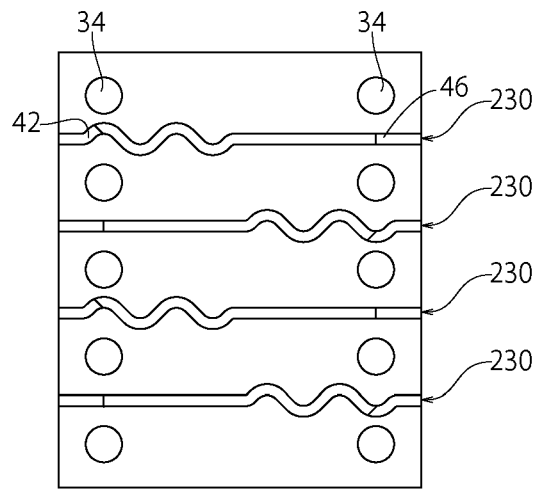
FIG. 6C is a view showing a modified example of the shapes of sipes and the arrangement of concave portions.
Figure 6D:
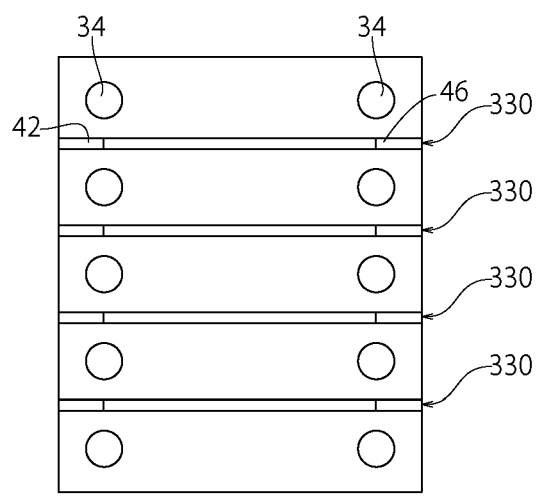
FIG. 6D is a view showing a modified example of the shapes of sipes and the arrangement of concave portions.

|  | Example 1 | Example 2 | Example 3 | Example 4 | Example 5 | Example 6 | Comparative Example 1 |
|---|---|---|---|---|---|---|---|
| Shape of sipe provided on block and arrangement of concave portion | FIG. 5B | FIG. 4A | FIG. 5A | FIG. 2 | FIG. 5C | FIG. 4B | FIG. 7 |
| Presence or Absence of concave portion | Presence | Presence | Presence | Presence | Presence | Presence | Absence |
| Steering stability on ice-covered road surface | 101 | 102 | 103 | 104 | 105 | 106 | 100 |

The above embodiments are merely examples, and the scope of the present invention is not limited thereto. Various omissions, substitutions, and changes can be made to the above embodiments without departing from the spirit of the present invention. The above embodiments and modifications thereof are intended to be included in the inventions described in the claims and their equivalents.

What is claimed is:

1. A pneumatic tire comprising a tread portion that comprises:

a land portion;

sipes provided on the land portion and each comprising a first sipe, a second sipe and a joint portion where the first sipe and the second sipe are butted in a sipe longitudinal direction; and concave portions each provided on the land portion between two of the sipes adjacent to each other, wherein each of the first sipe and the second sipe comprises an outer bottom protrusion and a portion of an inner bottom protrusion that comprises the joint portion, the outer bottom protrusion protruding from a bottom surface of the first sipe or the second sipe toward a tread surface, the inner bottom protrusion protruding from both the bottom surface of the first sipe and the bottom surface of the second sipe toward the tread surface, and becoming shorter in width toward the tread surface in a tire width direction in a sectional view, wherein each of the concave portions is arranged to vertically overlap one of the outer bottom protrusions or the inner bottom protrusion in the tire width direction in the sectional view, and each of the concave portions is configured to be shorter in width than the outer bottom protrusion in the tire width direction in the sectional view, wherein a leading end of the joint portion is pointed at an acute angle in the sectional view, and wherein a depth of each of the first sipe and the second sipe at a position where the inner bottom protrusion is provided is shallower than a depth of each of the first sipe and the second sipe at a position where the outer bottom protrusion is provided.

2. The pneumatic tire according to claim 1, wherein a diameter of each of the concave portions is not less than ½ and not more than twice a length of at least one of the inner bottom protrusion in the sipe longitudinal direction at a half position of the depth of the sipe.

3. The pneumatic tire according to claim 1, wherein an inner diameter of each of the concave portions increases toward the bottom.

4. The pneumatic tire according to claim 1, wherein a depth of each of the concave portions is not less than ¼ of the depth of a main groove.

5. The pneumatic tire according to claim 1, wherein when a distance between two of the sipes provided on both sides of each of the concave portions is defined as W1, and a distance along the tread surface from each of the concave portions to either the outer bottom protrusion or the inner bottom protrusion is defined as W2, W2/W1 is not less than 0.1 and not more than 0.3.

6. The pneumatic tire according to claim 1, wherein the first sipe and the second sipe have straight portions extending linearly as viewed from a direction perpendicular to the tread surface, and the first sipe and the second sipe are butted in the sipe longitudinal direction at the straight portions.

7. The pneumatic tire according to claim 1, wherein the first sipe and the second sipe have straight portions extending linearly and corrugated portions extending while meandering as viewed from a direction perpendicular to the tread surface, and the first sipe and the second sipe are butted in the sipe longitudinal direction at the straight portions.

8. The pneumatic tire according to claim 1, wherein at least one of the inner bottom protrusion protrudes from the bottom surfaces of the first sipe and the second sipe to the same position as the tread surface.

9. The pneumatic tire according to claim 1, wherein each of the concave portions is arranged to overlap a leading end of at least one of the inner bottom protrusion in a direction in which one of the sipes extends.

10. The pneumatic tire according to claim 1, wherein each of the concave portions is arranged such that a distance $W2a$ along the tread surface up to the outer bottom protrusion provided on the first sipe is equal to a distance $W2a$ along the tread surface up to the outer bottom protrusion provided the second sipe.

* * * * *